H. COLL.
Ejector.

No. 9,199. Reissued May 18, 1880.

Witnesses.
J. K. Smith
L. C. Fitler.

Inventor
Hugh Coll
by Bakewell & Kerr
his attorneys

N. PETERS, PHOTO-LITHOGRAPHER, WASHINGTON, D. C.

UNITED STATES PATENT OFFICE.

HUGH COLL, OF BLACK HAWK P. O., PENNSYLVANIA.

EJECTOR.

SPECIFICATION forming part of Reissued Letters Patent No. 9,199, dated May 18, 1880.

Original No. 110,205, dated December 20, 1870; Reissue No. 8,904, dated September 23, 1879. Application for reissue filed March 13, 1880.

*To all whom it may concern:*

Be it known that I, HUGH COLL, of Black Hawk P. O., in the county of Beaver and State of Pennsylvania, have invented a new and useful Improvement in Ejectors; and I do hereby declare the following to be a full, clear, and exact description thereof, reference being had to the accompanying drawings, making a part of this specification, in which—

Figure 1:
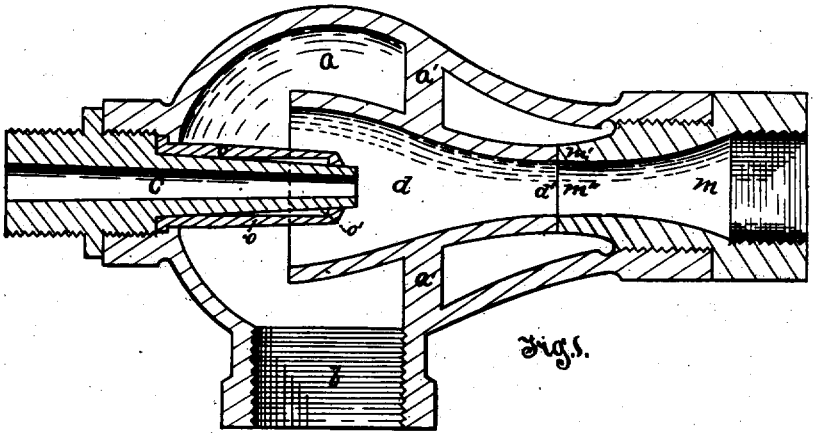
Figure 2:
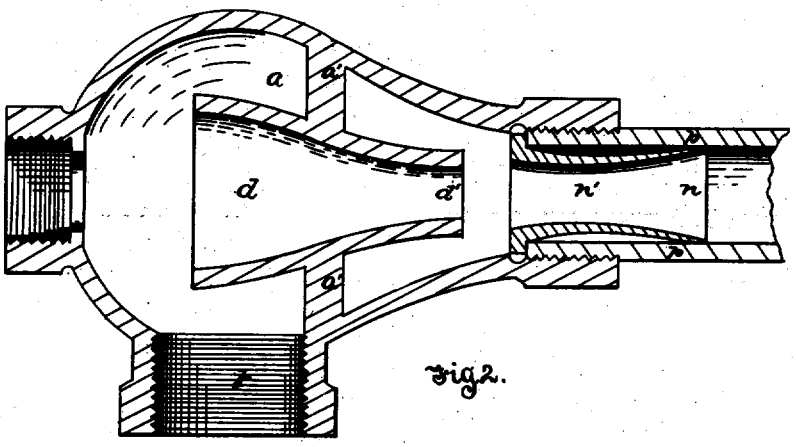
Figure 3:
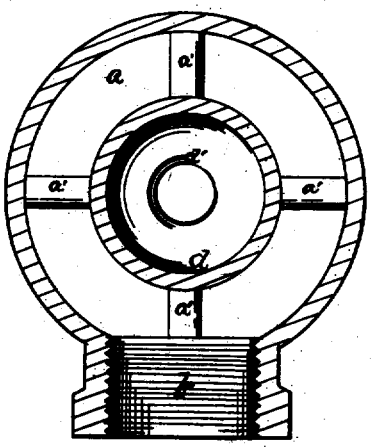

Figure 1 is a longitudinal vertical section of my improved pump; Fig. 2, by a like view, shows a modification thereof; and Fig. 3 is a vertical transverse section through radial arms, Fig. 1.

Like letters of reference indicate like parts in each.

My present invention relates to certain improvements in the siphon-pump patented to me June 8, 1869; and it consists in modifications of form and construction, whereby such pump is adapted to new uses, or to accomplish old results in a better manner.

To enable others skilled in the art to make and use my improvement, I will proceed to describe its construction and mode of operation.

The outer head, *a*, is of the usual construction, and has the usual water-inlet opening *b* and an opening for the insertion of the steam-injection pipe *c*.

The base or blunt end of the inner head of the original patent above referred to is cut off at or near the broadest part, so as to give a head or shell, *d*, open at the base, and with a bore diminishing toward its forward end, *d'*. This head *d* is connected, in casting, to the outer head, *a*, by means of radial arms *a'*, in any desired number.

The inner head, *d*, having a large unobstructed opening at its base, I have devised more particularly for use in pumping or ejecting bilge-water, the water out of tan-vats, &c. As some tan-bark is necessarily carried up with the water, the holes or passages for the water are apt to become clogged, unless ample room be left for the flow of both. I thus adapt the double head to the uses described.

I have also effected further improvements by the construction of nozzle-pieces which are interchangeable, and may be used with the same pump according to the varying conditions under which the water is to be raised.

The nozzle-piece *m*, Fig. 1, is designed for use in raising water to a considerable height with a comparatively small amount of steam. This nozzle-piece, at its rear end, *m'*, abuts against or is connected with the forward end, *d'*, of the inner head or tube, *d*, forming substantially an extension thereof, so as to give a smooth joint inside and least resistance to the flow of water. At its throat *m''* it is contracted somewhat, from which it opens into a larger pipe.

Another form of nozzle-piece, *n*, is shown in Fig. 2, in which the size of the throat *n'* is reduced, and which does not abut against the end of the inner pipe, *d'*, but leaves a space between it and the inner pipe, *d'*, so that a flow of water can be kept up from the space between the two heads. This form is designed for raising a larger body of water to a less height with the same amount of steam.

The nozzle *n* may be set loosely in the end of the main discharge-pipe *p*, as shown, or otherwise attached at pleasure.

This ejector operates on the same principle as my ejector patented June 8, 1869, does. The jet of steam being surrounded and protected by the inner head or shell, *d*, which acts as a breakwater or dam to break the force or impact of the inflowing current, does not condense so rapidly as in the old form of ejectors, where it came directly in contact with the whole volume and unbroken force of the inflowing water in the outer head. Its force is consequently preserved.

It will be seen that the forward end of the outer chamber is closed, and that the entire discharge of the pump is through the inner head, *d*, and that the rear opening of the inner head extends over the induction-opening, and acts as a breakwater to deflect and turn the inflowing stream of water to the back part of the head *a* and break its force.

Having thus described my improvement, what I claim, and desire to secure by Letters Patent, is—

A water-ejector provided with an inner head or shell extending backward over the waterinduction opening, and arranged with relation to the jet-pipe so as to protect the steam-jet from the direct impact of the inflowing current of water, the inner end of said head being provided with a large unobstructed opening, through which all the water passes to the discharge-outlet of the ejector, substantially as and for the purpose described.

In witness whereof I, the said HUGH COLL, have hereunto set my hand.

HUGH COLL.

Witnesses:
T. B. KERR,
JAMES H. PORTE.